United States Patent
Sagiraju et al.

(10) Patent No.: US 12,026,066 B2
(45) Date of Patent: *Jul. 2, 2024

(54) BACKING UP DATA FOR A NAMESPACE ASSIGNED TO A TENANT

(71) Applicant: Hewlett Packard Enterprise Development LP, Spring, TX (US)

(72) Inventors: Krishna Sagiraju, Adover, MA (US); William Cochrane, Belfast (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,030

(22) Filed: Jun. 2, 2023

(65) Prior Publication Data

US 2023/0315584 A1 Oct. 5, 2023

Related U.S. Application Data

(63) Continuation of application No. 17/485,910, filed on Sep. 27, 2021, now Pat. No. 11,693,742.

(51) Int. Cl.
  *G06F 11/14* (2006.01)
  *G06F 11/30* (2006.01)

(52) U.S. Cl.
  CPC ........ *G06F 11/1464* (2013.01); *G06F 11/142* (2013.01); *G06F 11/1451* (2013.01); *G06F 11/1469* (2013.01); *G06F 11/301* (2013.01)

(58) Field of Classification Search
  CPC ............... G06F 11/1464; G06F 11/142; G06F 11/1451; G06F 11/1469; G06F 11/301

(Continued)

(56) References Cited

U.S. PATENT DOCUMENTS 11,693,742 B2 * 7/2023 Sagiraju .............. G06F 11/1469
                                                714/6.12
2020/0012443 A1    1/2020 Chen et al.
(Continued)

FOREIGN PATENT DOCUMENTS

| CN | 110990150 A | 4/2020 |
| CN | 113132295 A | 7/2021 |
| WO | 2021/097397 A1 | 5/2021 |

OTHER PUBLICATIONS

Cloudark, "Multi-tenant SaaS using Kubernetes Operators", online available at <https://cloudark.medium.com/multi-tenant-saas-on-kubernetes-using-platform-as-code-a49301be9551>, Feb. 27, 2019, 5 pages.

(Continued)

*Primary Examiner* — Yair Leibovich
(74) *Attorney, Agent, or Firm* — Slater Matsil, LLP

(57) ABSTRACT

Examples described herein are generally directed to backing up and restoring of container clusters. According to an example, the conventional tight coupling between namespaces and tenants is eliminated by providing within a container platform a tenant abstraction for each tenant of the container platform that shares resources of a container cluster. The tenant abstraction for a given tenant includes information indicative of a subset of namespaces of the container cluster assigned to the given tenant. Responsive to receipt via a user interface of the container platform of a request to backup a particular tenant of the container platform: the container platform determines the subset of namespaces assigned to the particular tenant; and for each namespace, causes a namespace-level backup/recovery tool to backup object data for the namespace within a backup (Continued)

location, and backup data associated with persistent volume claims for each unit of cluster replication within the namespace.

20 Claims, 8 Drawing Sheets

(58) Field of Classification Search
USPC ........................................................ 714/6.12
See application file for complete search history.

(56) References Cited

U.S. PATENT DOCUMENTS

2020/0371698 A1* 11/2020 Chen ..................... G06F 3/0629
2022/0147391 A1   5/2022 Balcha et al.
2023/0148158 A1*  5/2023 Bandarupalli ...... H04L 67/1008
                                                          709/224

OTHER PUBLICATIONS

Dell Technologies, "ECS Overview and Architecture", Technical White Paper, Feb. 2021, 55 pages.
Github, "Tenant backup and restore of a Tenant: #2", available online at <https://github.com/clastix/capsule/issues/2>, Jul. 22, 2020, 5 pages.
Google Cloud, "Cluster multi-tenancy", Kubernetes Engine Documentation, available online at <https://cloud.google.com/kubernetes-engine/docs/concepts/multitenancy-overview>, Apr. 29, 2021, 8 pages.
Hall, Susan, "K8Spin Provides Multitenant Isolation for Kubernetes—The New Stack", online available at <https://thenewstack.io/k8spin-provides-multitenant-isolation-for-kubernetes/>, Oct. 5, 2020, 15 pages.
Hewlett Packard Enterprise, "HPE Ezmeral Container Platform 5.0 Documentation," 2021, 2 pages, Retrieved from the Internet on Apr. 13, 2021 at URL: docs.containerplatform.hpe.com/50/50/kubernetes/kubernetes-administration/tenants/Creating_a_New_Kubernetes_Tenant.html.
Hitachi Vantara, "Hitachi Content Platform Architecture Fundamentals", White Paper, Jun. 2020, 34 pages.
Ludwin, Adrian, "Introducing Hierarchical Namespaces: Kubernetes", online available at <https://kubernetes.io/blog/2020/08/14/introducing-hierarchical-namespaces/>, Aug. 14, 2020, 4 pages.
Portworx, "Essential Capabilities for Kubernetes Backup and Recovery", available online at <https://portworx.com/blog/kubernetes-backup-and-recovery/>, Mar. 25, 2020, 7 pages.
Red Hat, "Projects and Users—Core Concepts: Architecture: OpenShift Container Platform 3.11", online available at <https://docs.openshift.com/container-platform/3.11/architecture/core_concepts/projects_and_users.html>, 2021, 3 pages.
Velero, "How Velero Works," 2021, 4 pages, Retrieved from the Internet on Apr. 13, 2021 at URL: velero.io/docs/v1.6/how-velero-works/.
VMware, "Lab Overview—HOL-2033-01-CNA—Managing and Extending Kubernetes-Getting Started", Jul. 31, 2020, 88 pages.
Wuestkamp, Kim, "Multi-tenant Rancher Kubernetes cluster", online available at <https://itnext.io/multi-tenant-rancher-kubernetes-cluster-dbac3d739b1c>, retrieved on May 17, 2020, 15 pages.
Zheng et al., "A Multi-Tenant Framework for Cloud Container Services", arXiv:2103.13333 [cs.DC], Mar. 24, 2021, 11 pages.

* cited by examiner

BACKING UP DATA FOR A NAMESPACE ASSIGNED TO A TENANT

CROSS-REFERENCE TO RELATED APPLICATIONS

This application is a continuation application of and claims priority to application Ser. No. 17/485,910, filed on Sep. 27, 2021, the contents of which are hereby incorporated by reference in their entireties.

BACKGROUND

Namespaces are a way to organize container clusters (e.g., Kubernetes clusters) into virtual sub-clusters. Namespaces can be helpful when different teams or projects share a container cluster (e.g., a Kubernetes cluster). Making use of namespaces may provide benefits relating to organization, isolation, permissions, resource control, and performance. For example, by organizing the cluster resources of different teams or projects within their own virtual clusters using namespaces other than a default namespace that might be provided by the container orchestration engine (e.g., Kubernetes), the teams or projects may use the same resource names in different namespaces without conflict. Also, taking an action on items in one namespace can be precluded from having effects on other namespaces.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Figure 1:
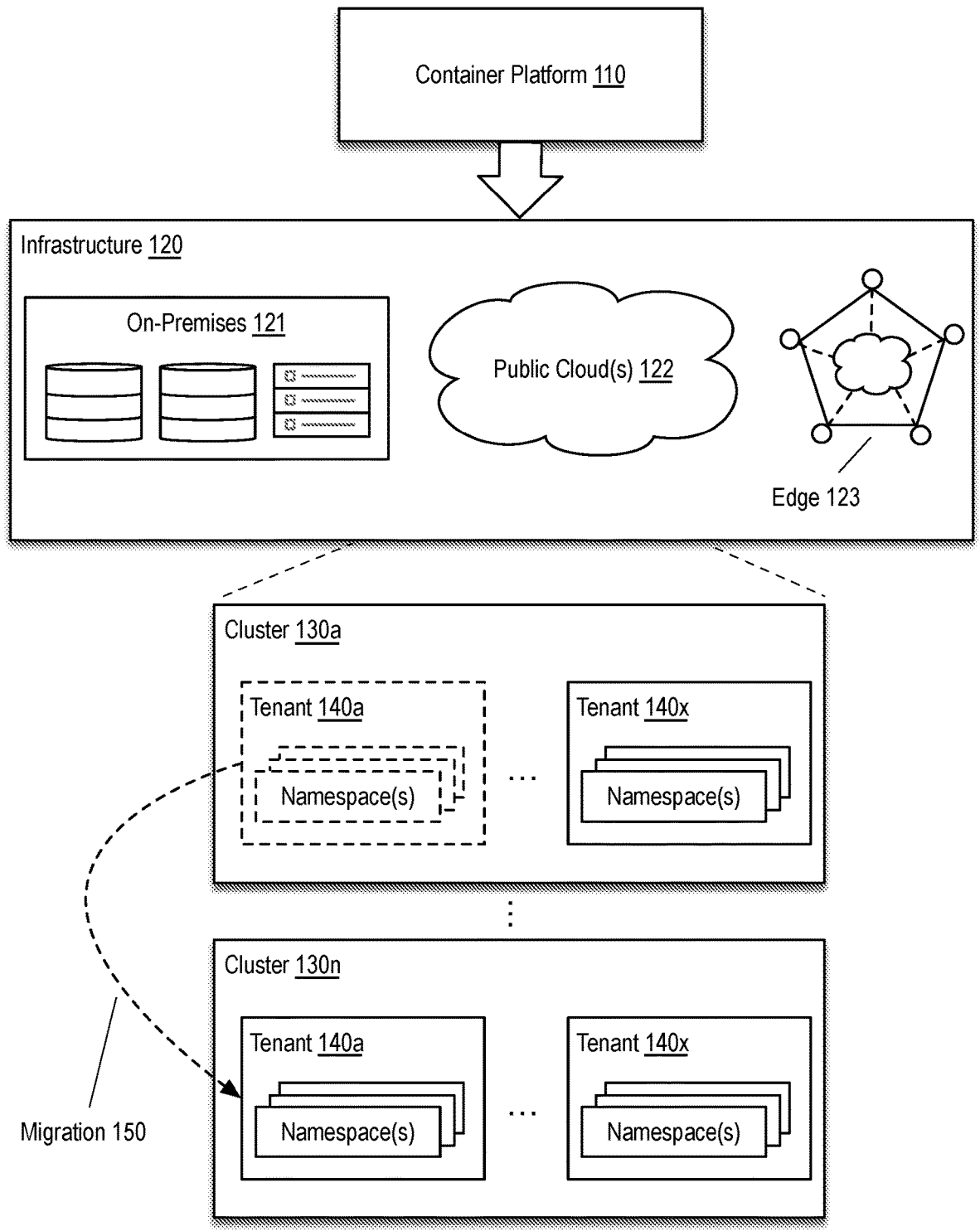
FIG. 1 shows a block diagram conceptually illustrating a container platform and associated infrastructure it may make use of in accordance with an example.

Examples described herein are generally directed to backing up and restoring of container clusters. Numerous specific details are set forth in order to provide a thorough understanding of exemplary aspects. It will be apparent, however, to one skilled in the art that examples described herein may be practiced without some of these specific details.

While there are various advantages of using multiple namespaces within container clusters, at present, container orchestration engines (e.g., Kubernetes) and backup and restore tools (e.g., Velero) perform (i) resource management and isolation and (ii) backup and restore operations, respectively, at the namespace level as a result of treating namespaces and tenants as one and the same. This restrictive convention precludes a notion of tenancy in which tenants make use of multiple namespaces.

It would be desirable to eliminate the conventional notion of a strict one-to-one alignment among tenants and namespaces assumed by existing container orchestration engines by removing the tight coupling exhibited between tenants and namespaces within existing container orchestration engines and backup and restore tools to allow, among other things, resource management and isolation and backup and restore operations to be performed at a tenant-level (on a per-tenant basis) in addition to or as an alternative to supporting such operations at a namespace-level (on a per-namespace basis). In this manner, to the extent a tenant includes multiple namespaces, a user may be insulated from the details regarding which namespaces are assigned to which tenants. As such, a user need not keep track of which namespaces are assigned to tenants, for example, to ensure all namespaces associated with a tenant are included in a backup and can instead simply issue requests at the granularity of a tenant to a container platform to perform various operations (e.g., backup, restore, migrate, clone, and/or copy).

In general, examples described herein seek to provide tenant-level operations and management by providing a more flexible association between tenants and namespaces to allow, among other things, the flexibility of assigning one or more namespaces to tenants. In accordance with one example, namespaces and tenants are not required to have a one-to-one correspondence by providing within a container platform a tenant abstraction for each tenant of multiple tenants of the container platform that share resources of a container cluster. The tenant abstraction for a given tenant may include, among other information, information indicative of a subset of namespaces of the container cluster that are assigned to the given tenant. Responsive to receipt via a user interface of the container platform of a request to backup a particular tenant of the multiple of tenants, the container platform may determine those of the namespaces assigned to the particular tenant. Then, for each namespace, the container platform may cause a namespace-level backup/recovery tool to backup object data for the namespace within a backup location, and backup data associated with persistent volume claims for each unit of cluster replication within the namespace.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one example" or "an example" means that a particular feature, structure, or characteristic described in connection with the example can be included in at least one implementation. The appearances of the phrase "in one example" are not necessarily all referring to the same example.

The terms "component", "module", "system," and the like as used herein are intended to refer to a computer-related entity. Such a component, module, or system may be in the form of a software-executing general-purpose processor, hardware, firmware, or a combination thereof. For example, a component may be, but is not limited to being, a process running on a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

FIG. 1 shows a block diagram conceptually illustrating a container platform 110 and associated infrastructure 120 it may make use of in accordance with an example. In one example, the container platform 220 represents a multitenant software solution that makes it easier, faster, and/or more cost-effective to deploy various types of environments within container clusters (e.g., clusters 130a-n). For example, a user (e.g., a data engineer, a data scientist, an application developer, or a member of a DevOps team) may deploy large-scale Artificial Intelligence (AI) or Big Data environments, including, but not limited to, TensorFlow, Spark, Kafka, and Hadoop on a variety of infrastructure 120 (e.g., compute, storage, and networking), whether on-premises 121, in public cloud(s) 122, in a hybrid model, or at the edge 123. Users of the container platform 110 may also create distributed environments for Machine Learning (ML), data science, and analytics in minutes, rather than months. The container platform 110 may include a self-service provisioning experience to deliver the data and tools that data science teams need while also providing enterprise-grade security and reducing costs.

Users may make use of container platform 110 to deploy and manage container clusters (e.g., clusters 130a-n), including multiple hosts from one or more of on-premises 121, public cloud(s) 122, and edge 123 for running and orchestrating containerized applications. Generally, container technology is a computing virtualization paradigm where an application is packaged together with dependencies and libraries in a container to provide an isolated environment for running the application. Such an application may be referred to as a containerized application. Many containers (in pods) can run on top of a single operating system, but each container is inherently isolated from other containers. In this manner, the container paradigm may be understood to virtualize the operating system. Containers may be more lightweight than other forms of virtualization, such as virtual machines, which virtualize hardware. For example, each virtual machine may have its own copy of an operating system kernel, while by contrast, multiple containers may share an operating system kernel.

In some implementations, container platform 110 orchestrates scheduling and running containers of an application of a tenant (e.g., tenants 140a-x) directly on bare metal, that is, directly on the host hardware without running the containers within virtual machines running on a hypervisor that runs on the host bare metal hardware. In other implementations, container platform 110 orchestrates running containers of a tenant application in virtual machines.

In various examples described herein, the container platform 110 supports tenant-level operations (e.g., backup, restore, migrate, clone, and/or copy) and resource management for any number of namespaces that may be assigned to a tenant by rejecting the existing convention of tenants and namespaces having a one-to-one correspondence. In this manner, the container platform 110 has the flexibility of assigning one or more namespaces of the container cluster to tenants. For example, as described further below, a migration 150 of tenant 140a from cluster 130a to cluster 130n may be performed responsive to receipt of a tenant-level migrate request, specifying a tenant identifier (ID) or tenant name and without requiring the initiator of the request to have knowledge of the one or more namespaces assigned to the tenant 140a. Various components that may be implemented within container platform 110 are described below with reference to FIG. 2.

Figure 2:
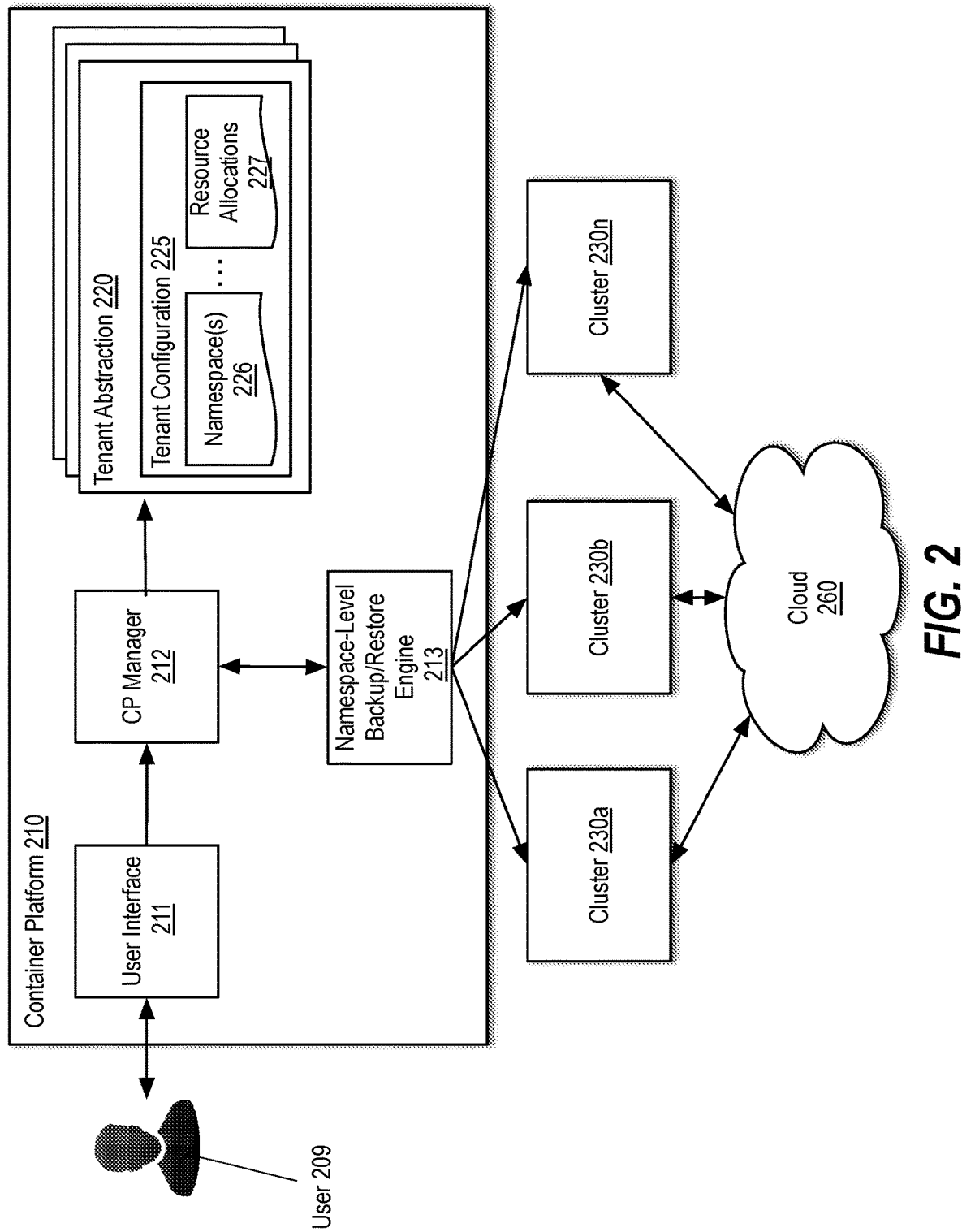
FIG. 2 shows a block diagram conceptually illustrating use of tenant abstractions by a container platform in accordance with an example.

FIG. 2 shows a block diagram conceptually illustrating use of tenant abstractions (e.g., tenant abstraction 220) by a container platform 210 in accordance with an example. In the context of the present example, a user 209 (e.g., a tenant member, a tenant administrator or a platform administrator) may issue requests to container platform 210 to perform various tenant-level operations (e.g., backup, restore, migrate, clone, and/or copy). For example, user 209 may initiate a backup of object data associated with the namespaces assigned to a particular tenant (e.g., one of tenants 140a-x) and persistent data associated with each unit of cluster replication (e.g., the data associated with the persistent volume claims for each unit of cluster replication) within the namespaces.

In the context of the present example, the container platform 210 (which represents a non-limiting example of container platform 110 of FIG. 1) is shown including a user interface 211, a container platform (CP) manager 212, a namespace-level backup/restore engine 213, and a tenant abstraction 220 for each tenant of the container platform 210.

The namespace-level backup/restore engine 213 may be responsible for performing operations (e.g., backup, restore, migrate, clone, and/or copy) for a source namespace in a container cluster (e.g., one of clusters 230a-n) to a specified backup location (e.g., within cloud 260), from an existing backup to a target container cluster (e.g., one of clusters 230a-n), and/or from a source namespace in a container cluster to a target container cluster. A non-limiting example of namespace-level backup/restore engine 213 is the open source tool Velero (formerly, Heptio Ark).

User interface (UI) 211 may provide users (e.g., user 209) of the container platform with a browser-based interface through which various views and dashboards may be presented. For example, UI 211 may provide a tenant administrator with cluster-wide views of resource utilization, including central processing unit (CPU) cores, node storage, memory, persistent storage, tenant storage, and network traffic. Relevant to the examples described herein, UI 211 may provide users with the ability to select or otherwise specify a tenant or a backup on which an operation is to be performed.

CP manager 212 may be responsible for, among other things, routing and/or handling requests received via the user interface 211. For example, in the context of the present example, the CP manager 212 may translate tenant-level requests relating to backup, restore, migrate, clone, and/or copy operations to respective namespace-level requests that may be carried out by the namespace-level backup/restore engine 213. As described further below with reference to FIGS. 3-4, the CP manager 212 may also perform additional tasks (e.g., creation of a backup location, recreation of a previously-existing tenant, and/or copy/mirror/replication of tenant storage that is outside of the control of the container orchestration engine) before or after completion of the tenant-level operation at issue.

An instance of the tenant abstraction 220 may be created for each tenant of the container platform, to among other things, organize their respective namespaces. Depending upon the particular implementation, tenants may represent business units, departments, teams or other groups of users from the same or from different organizations. The tenant abstraction 220 may store a tenant configuration 225. The tenant configuration 225 may include namespace(s) 226, resource allocations 227, and other tenant-specific information. For example, the tenant configuration may include information regarding a filesystem mount to tenant storage that is available for use by the tenant.

The namespace(s) 226 may represent a list of one or more namespace identifiers (IDs) or names of the namespaces that are assigned to the corresponding tenant. By maintaining a list or set of one or more namespaces associated with a given tenant, the restrictive convention that assumes a one-to-one correspondence between tenants and namespaces may be eliminated, thereby removing the former tight coupling between tenants and namespaces. In this manner, a subset of the namespaces of a container cluster may be assigned to each tenant that is to share resources of a container cluster.

Depending upon the particular implementation, some or all of the information associated with the tenant configuration 225 (shown as being stored locally within the tenant abstraction 220 in the context of the present example) may be stored external to the tenant abstraction 220, for example, in a database. In such a case, the tenant abstraction 220 may store information (e.g., a pointer, an address, or a uniform resource locator (URL)) indicative of the external data store or database in which the tenant configuration information at issue is stored.

Various components (e.g., clusters, user interface, CP manager, and namespace-level backup/restore engine) described herein (e.g., with reference to FIGS. 1-2) and the processing described herein (e.g., the processing described below with reference to the flow diagrams of FIGS. 3-4) may be implemented in the form of executable instructions stored on a machine readable medium and executed by a hardware-based processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more computer systems of various forms (e.g., servers, blades, desktop computers, laptop computers), such as the computer system described below with reference to FIG. 6.

Figure 3:
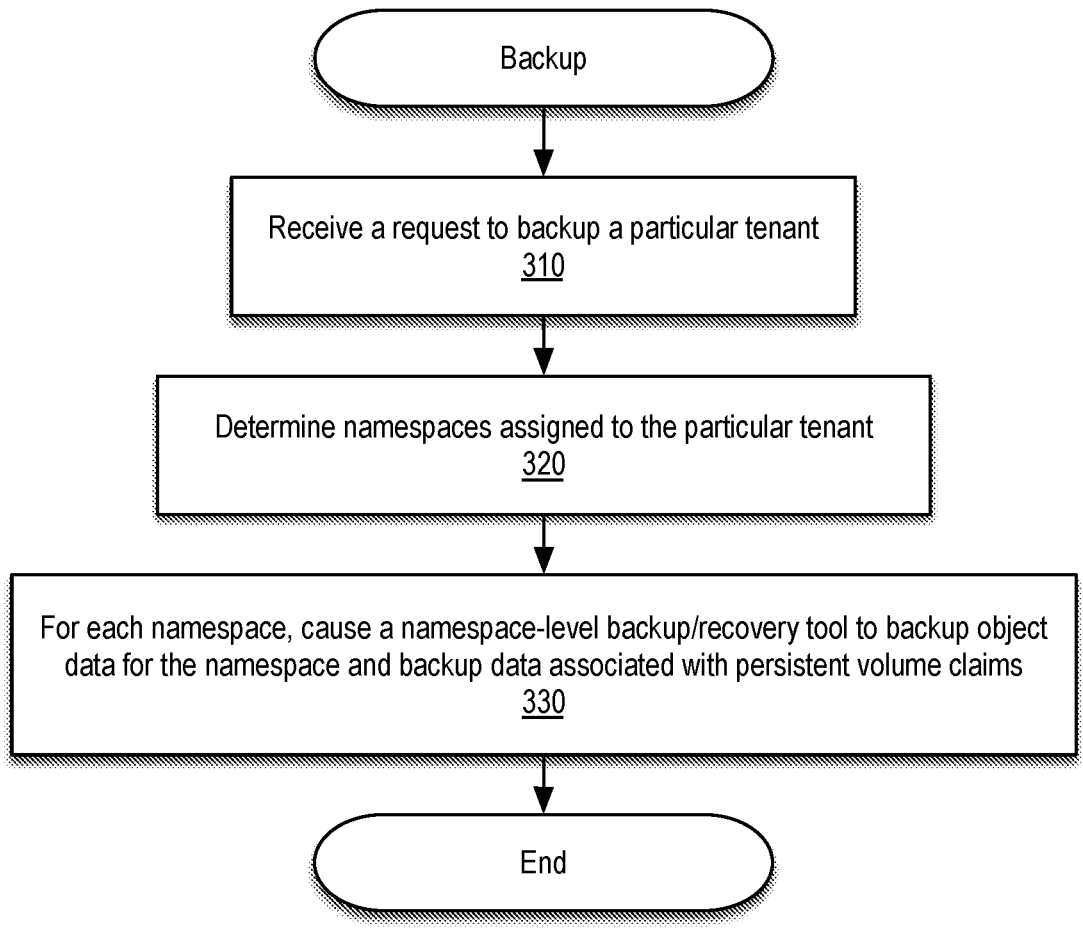
FIG. 3 shows a flow diagram illustrating backup processing in accordance with an example.

FIG. 3 shows a flow diagram illustrating backup processing in accordance with an example. This example assumes the existence of a container platform (e.g., container platform 110) that provides a tenant abstraction (e.g., tenant abstraction 220) for each of multiple tenants of the container platform that share resources of a container cluster (e.g., one of clusters 130*a*-*n*). As noted above, the tenant abstraction for a given tenant may include, among other things, information indicative of one or more namespaces of the container cluster assigned to the given tenant.

At block 310, a request is received to backup a particular tenant. In one example, the request is received via a user interface (e.g., user interface 211) from a user (e.g., user 209) and is handled by a management component (e.g., CP manager 212) of the container platform. Depending upon the particular implementation and the permissions of the user at issue, the request may specify multiple tenants for which respective namespaces are to be backed up.

At block 320, one or more namespaces assigned to the particular tenant are determined. For example, the management component may query the tenant abstraction corresponding to the particular tenant for a list of namespaces that are assigned to the particular tenant. Responsive to receipt of the list of namespaces, the management component may create a backup location indicative of where the backed up data/information is to be stored. The backup location may represent a location within public cloud storage (e.g., an Amazon Web Services (AWS) Simple Storage Service (S3) backup location or an analogous location within Google or Azure storage).

At block 330, for each namespace, a namespace-level backup/recovery tool (e.g., namespace-level backup/restore engine 213) is caused to backup object data for the namespace and to backup data associated with persistent volume claims. The object data may include data associated with persistent entities (e.g., Kubernetes objects) in the container cluster that represents the state of the container cluster. The data associated with the persistent volume claims may represent data persisted to storage that is associated with the container cluster. In one example, the management component directs the namespace-level backup/recovery tool to perform a backup of the data associated with the list of namespaces (determined in block 320) to a particular backup location (e.g., the backup location created in block 320). For its part, the namespace-level backup recovery tool may create a backup object (e.g., a Kubernetes backup object) for storage of the object data for each of the namespaces at issue, commence the backup to capture all the object data for the selected namespaces, and then store the backup object in a remote location (e.g., cloud 260). The namespace-level backup/recovery tool may also backup persistent data associated with each unit of cluster replication within the namespaces to the backup object. For example, the namespace-level backup/recovery tool may backup the data associated with persistent volume claims (PVCs) for each unit of cluster replication within the namespaces.

While in the context of the present example, a number of enumerated blocks are included, it is to be understood that examples may include additional blocks before, after, and/or in between the enumerated blocks. Similarly, in some examples, one or more of the enumerated blocks may be omitted or performed in a different order.

Figure 4:
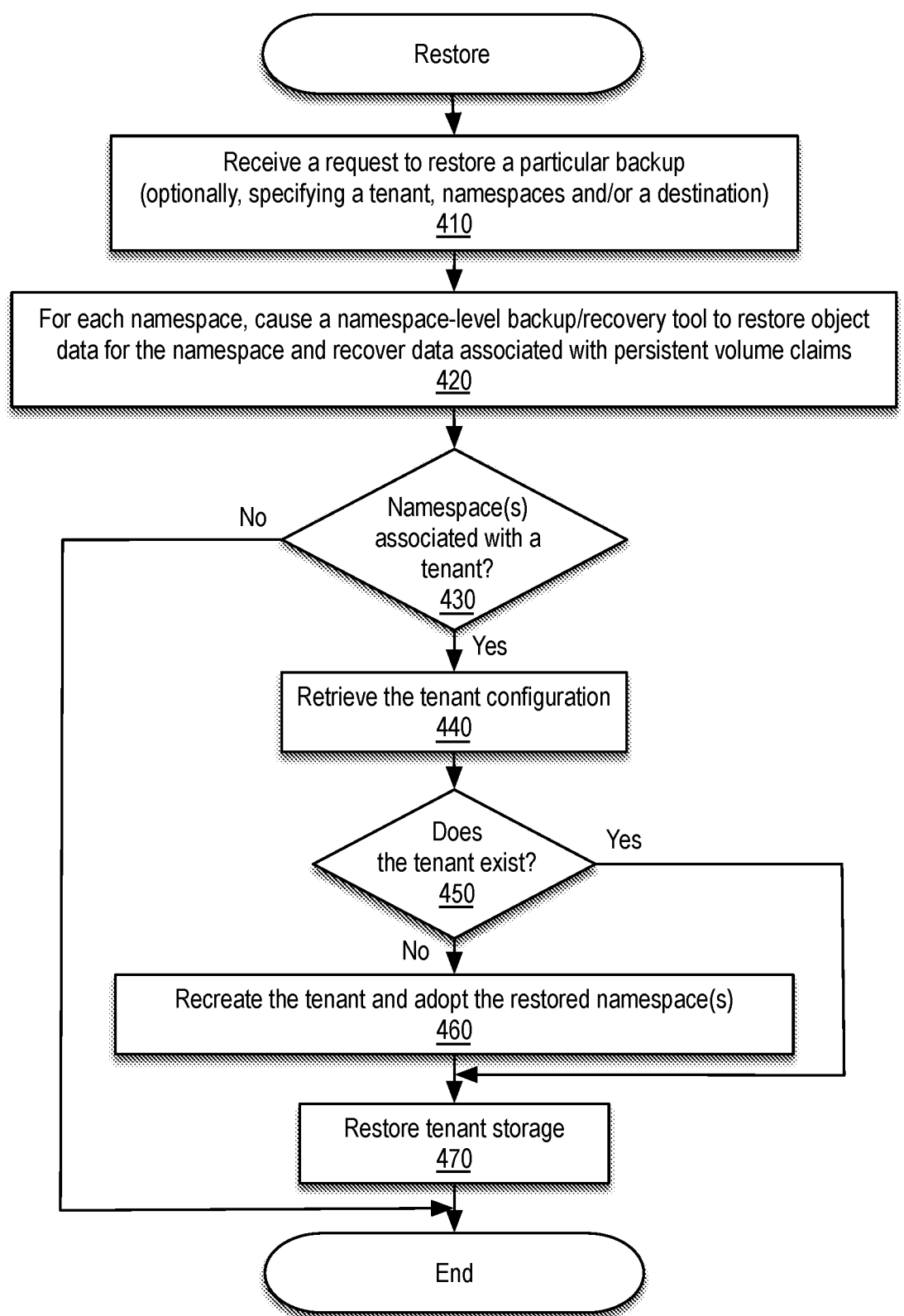
FIG. 4 shows a flow diagram illustrating restore processing in accordance with an example.

FIG. 4 shows a flow diagram illustrating restore processing in accordance with an example. At block 410, a request is received to restore a particular backup. As above, the request may be received via a user interface (e.g., user interface 211) from a user (e.g., user 209) and may be handled by a management component (e.g., CP manager 212) of the container platform (e.g., container platform 110). The request may optionally specify a tenant, one or more namespaces, and/or a destination/target (e.g., one of the container clusters). For example, the user may indicate which namespaces/tenants within the particular backup he/she wishes to restore.

At block 420, the restore operation may be submitted by the management component to the namespace-level backup/restore tool, which may in turn cause a restore object (e.g., a Kubernetes restore object) to be created. Then, for each namespace (e.g., only those namespaces specified in block 410 from among those associated with the particular backup or all namespaces associated with the particular backup), the namespace-level backup/restore tool performs the restore process for the namespace, for example, including extracting from the backup location the backed up data associated with the namespace and persistent data associated with each unit of cluster replication within the namespace.

At decision block 430, a determination is made regarding whether the namespace(s) is/are associated with a tenant of the container platform. For example, the management component may identify the correspondence of a particular namespace with a particular tenant by querying the tenant abstractions (e.g., tenant abstraction 220). Alternatively, the management component may query a container platform agent running within the cluster at issue to check a tenant label associated with the namespace(s) at issue. In either case, if the namespace(s) are determined to be associated with a tenant of the container platform, processing continues with block 440; otherwise, restore processing is complete.

At block 440, the tenant configuration of the tenant determined at block 430 to be associated with the namespace (e.g., tenant configuration 225) is retrieved. For example, the management component may retrieve the tenant configuration from the corresponding tenant abstraction or from an external location specified by the tenant abstraction.

At decision block 450, it is determined whether the tenant at issue exists. If so, processing branches to block 470; otherwise, processing continues with block 460. According to one embodiment, this determination can be made with reference to tenant information maintained within the container platform. Depending on the particular implementation, a container cluster namespace may include an annotation indicating to what tenant (e.g., the tenant ID) the namespace refers, as understood by the container platform (and stored in a CP database).

At block 460, the tenant may be recreated and the restored namespaces may be adopted. For example, the management component may recreate a new tenant using the same configuration the tenant previously had by using the tenant configuration retrieved at block 440 and may adopt the restored namespace. In one embodiment, adopting a namespace to a tenant refers to creation of the namespace prior to tenant creation followed by the container platform attaching the restored namespace to the tenant or otherwise forming an association between the restored namespace and the tenant. For purposes of illustration, consider, a scenario in which the tenant originally resided within one cluster (e.g., cluster A) and is being restored to a different cluster (e.g., cluster B). In this scenario, in cluster A, the tenant's namespaces are backed up. Then, on cluster B, the restoration of the namespaces occurs. At this point, the namespace annotations may be examined to determine the original tenant identity. Using this tenant identify, a database maintained by the container platform may be searched to determine whether the original tenant still exists. If it does, then the original tenant configuration may be used to recreate a new tenant that adopts the namespace(s) that have just been restored.

At block 470, the tenant storage may be restored. As noted above, tenant storage may be outside the control of the container orchestration engine. Tenant storage may represent private storage usable by the tenant that is visible to the containers/apps running within the tenant namespace(s). Alternatively or additionally, tenant storage may store application configurations, YAML Ain't Markup (YAML) files, etc., which the user can use for purposes of instantiating/configuring apps, etc. Depending upon the particular implementation, the tenant storage may be restored by the management component in a variety of ways. For example, as described further below with reference to FIGS. 5A-C, tenant storage may be restored by creating a new file system mount (e.g., pointing to a new empty storage area, pointing to a new storage area to which the contents of the tenant storage currently existing on the old cluster has been replicated, or pointing to the storage that currently exists on the old cluster).

Although in the context of the present example, the potential for restoring tenant storage for an existing tenant (that previously had no tenant storage) is addressed by block 470 following the "yes" path of decision block 450, in alternative embodiments, restore processing may terminate after the "yes" path of decision block 450, without performing block 470.

While in the context of the present example, a number of enumerated blocks are included, it is to be understood that examples may include additional blocks before, after, and/or in between the enumerated blocks. Similarly, in some examples, one or more of the enumerated blocks may be omitted or performed in a different order.

To the extent, the namespace-level backup/restore tool does not overwrite an existing tenant configuration when the tenant is being restored to a new cluster, it is appropriate to expect the user to clear appropriate resources/namespaces before restoring; however, in one example, the management component may delete current tenant configuration (e.g., remove all namespaces to be restored) to ensure that the namespaces/resources being restored are cleared prior to restoration.

For purposes of brevity, flow diagrams for various other tenant-level operations (e.g., migrate, copy, and clone) are not described herein as they may be implemented with a combination of appropriate backup and restore operations.

Figure 5A:
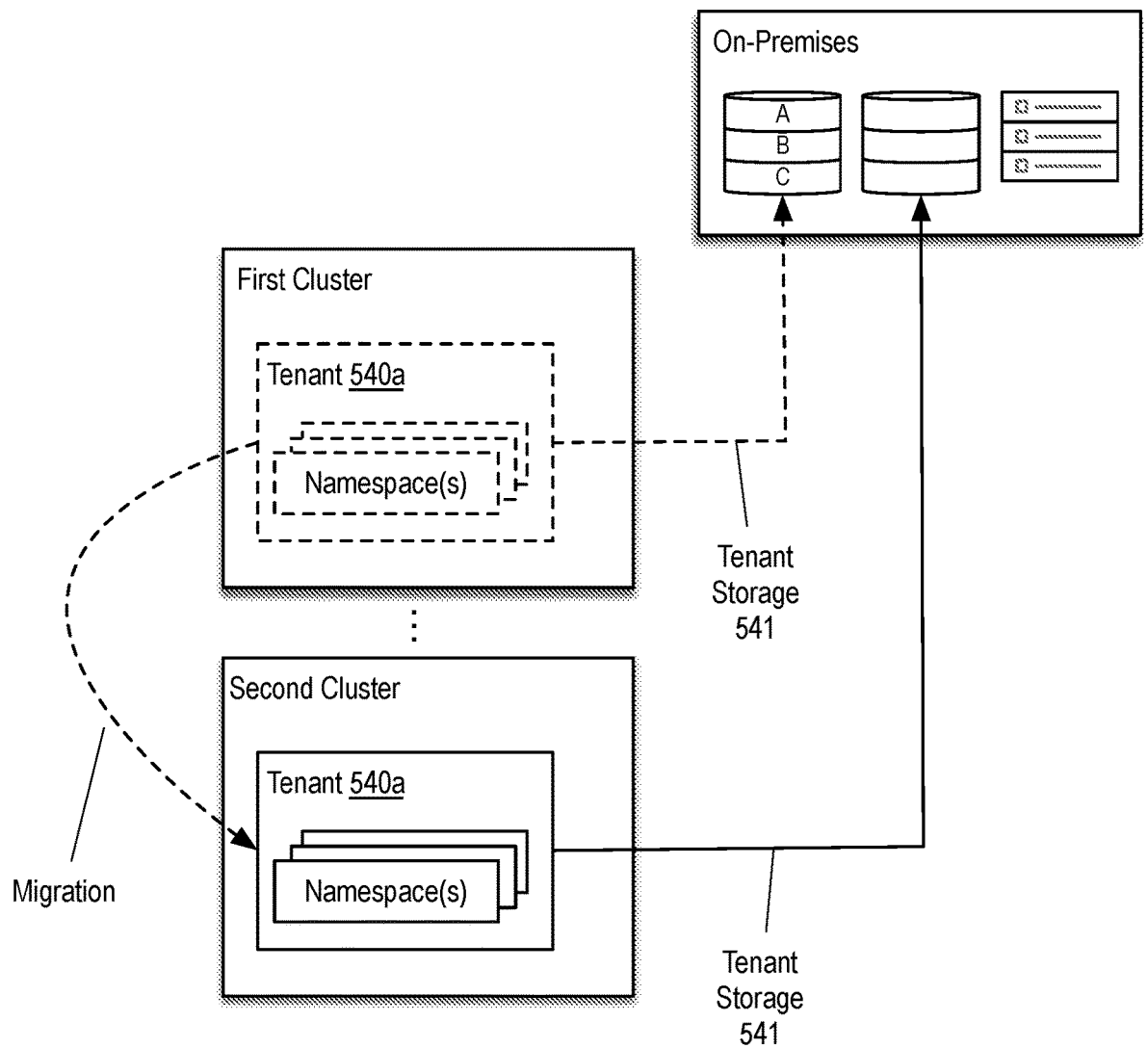
FIG. 5A shows a block diagram illustrating an approach for supporting migration of tenant storage in accordance with a first example.
Figure 5B:
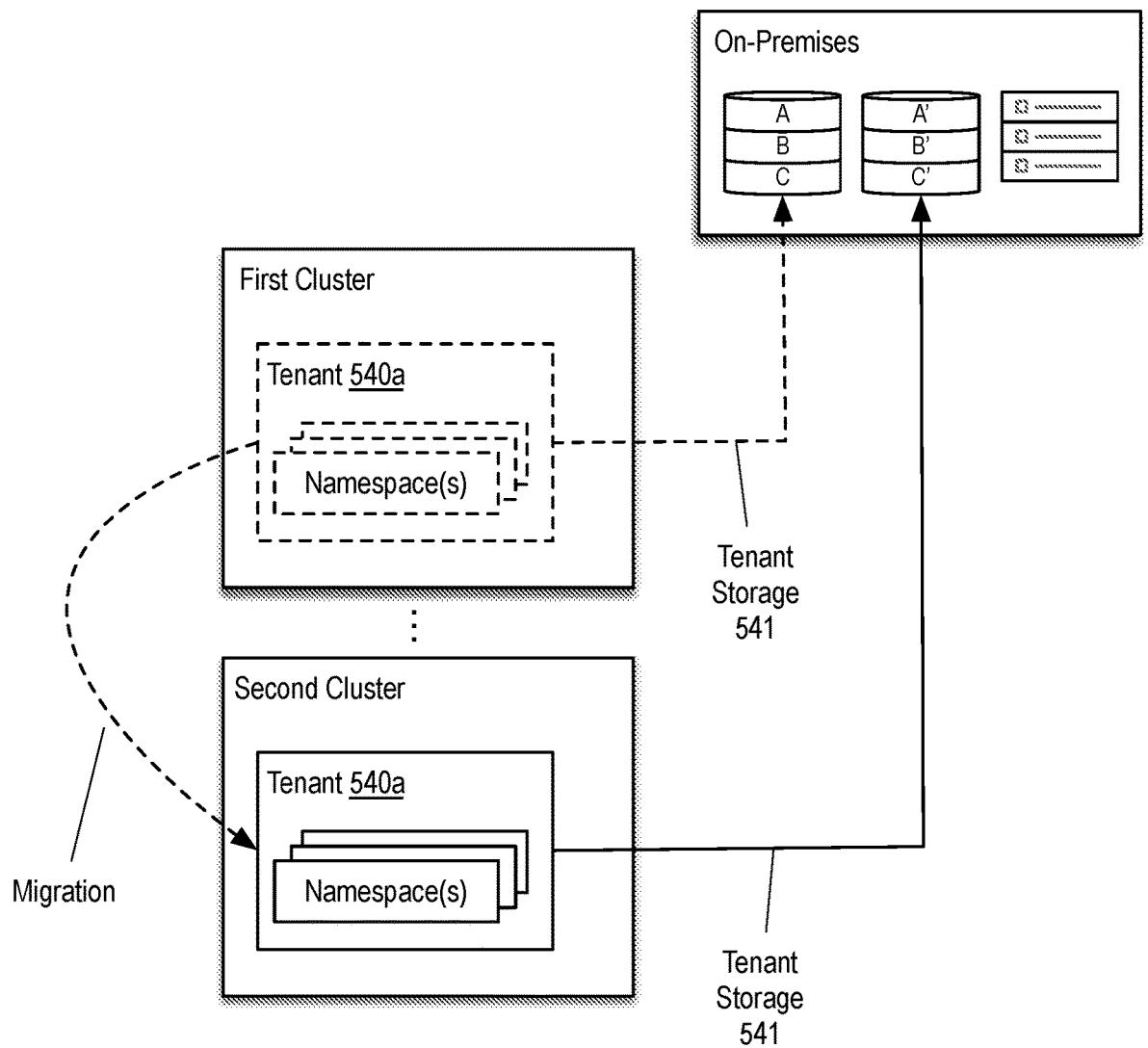
FIG. 5B shows a block diagram illustrating an approach for supporting migration of tenant storage in accordance with a second example.
Figure 5C:
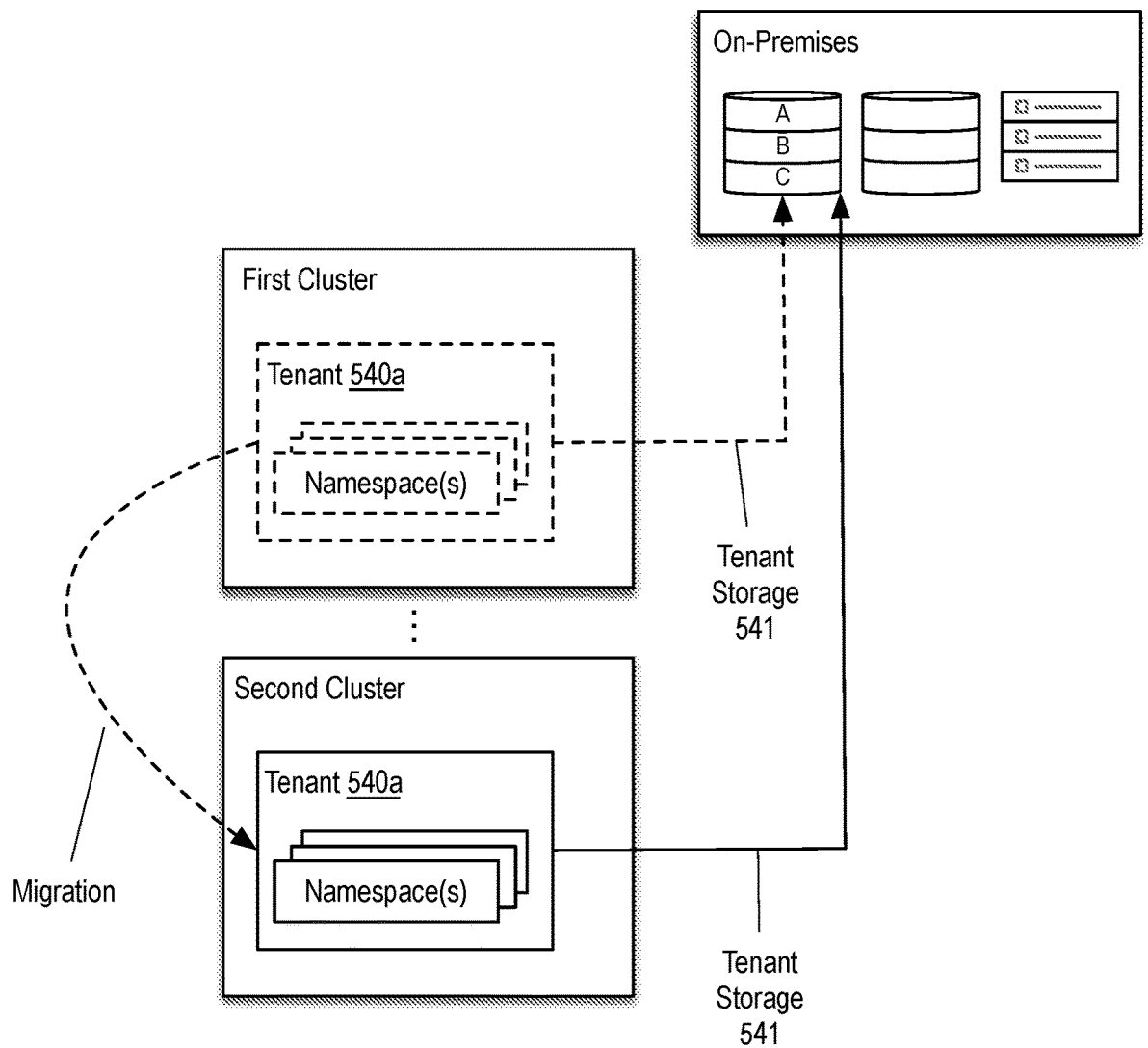
FIG. 5C shows a block diagram illustrating an approach for supporting migration of tenant storage in accordance with a third example.

FIGS. 5A-C illustrate three example scenarios for restoring tenant storage 541 when a tenant (e.g., one of tenants 140*a-x*) has been migrated, for example, as a result of a combination of a backup of the tenant on a first cluster (e.g., one of clusters 130*a-n*) and a subsequent restore of the tenant to a second cluster (e.g., another of clusters 130*a-n*). In the context of the example depicted in FIG. 5A, restoration of the tenant storage 541 may involve a management component (e.g., CP manager 212) creating a new file system mount for the second cluster pointing to a new empty on-premises storage area. Turning now to the example depicted in FIG. 5B, restoration of the tenant storage 541 may involve the management component creating a new file system mount for the second cluster pointing to a new on-premises storage area to which the contents of the tenant storage currently existing on the first cluster has been replicated. Finally, in the context of the example depicted in FIG. 5C, the management component may restore the tenant storage 541 by creating a new file system mount for the second cluster pointing to the original on-premises tenant storage area.

Figure 6:
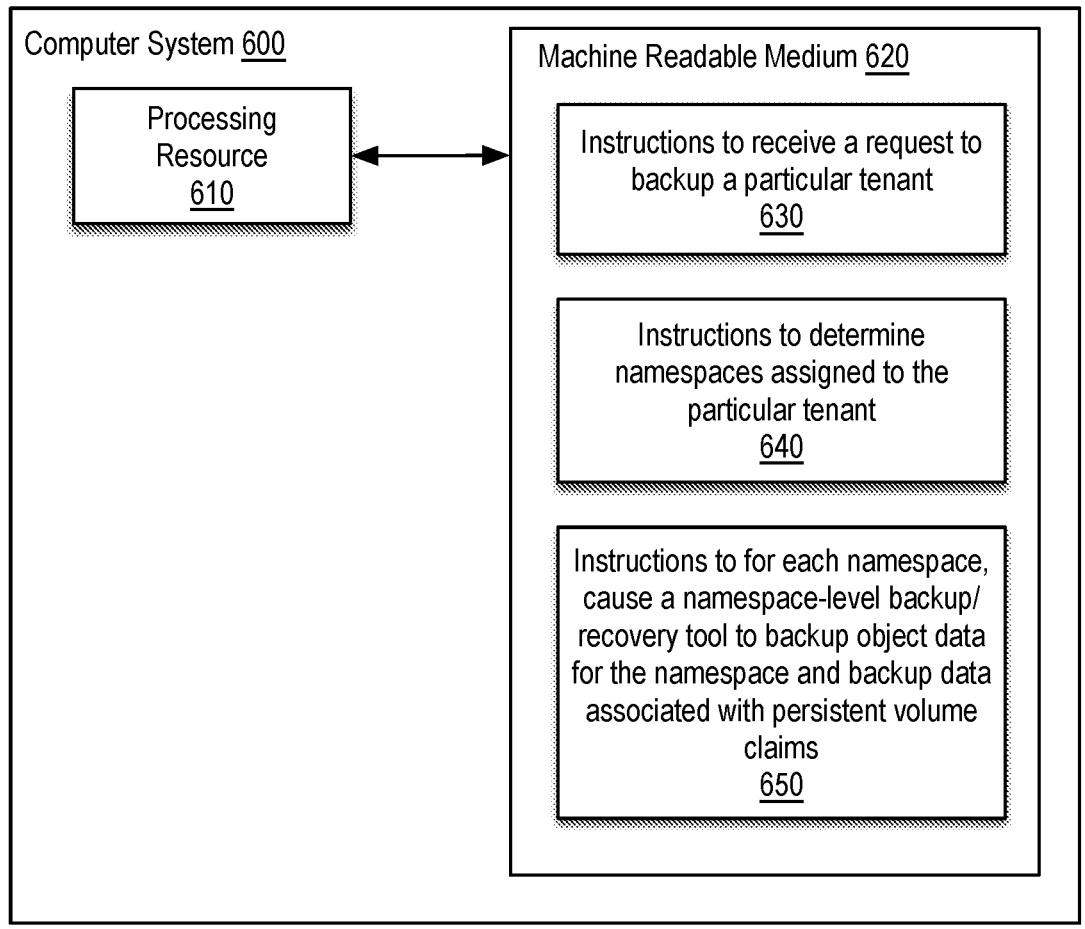
FIG. 6 shows a block diagram of a computer system in accordance with an example.

FIG. 6 shows a block diagram of a computer system in accordance with an example. In the example illustrated by FIG. 6, computer system 600 includes processing resource 610 coupled to non-transitory, machine readable medium 620 encoded with instructions to perform one or more processes described herein Processing resource 610 may include a microcontroller, a microprocessor, CPU core(s), GPU core(s), an ASIC, an FPGA, and/or other hardware device suitable for retrieval and/or execution of instructions from machine readable medium 620 to perform the functions related to various examples described herein. Additionally or alternatively, processing resource 610 may include electronic circuitry for performing the functionality of the instructions described herein.

Machine readable medium 620 may be any tangible medium suitable for storing executable instructions. Non-limiting examples of machine readable medium 620 include RAM, ROM, EEPROM, flash memory, a hard disk drive, an optical disc, or the like. Machine readable medium 620 may be disposed within computer system 600, as shown in FIG. 6, in which case the executable instructions may be deemed "installed" or "embedded" on computer system 600. Alternatively, machine readable medium 620 may be a portable (e.g., external) storage medium, and may be part of an "installation package." The instructions stored on machine readable medium 620 may be useful for implementing at least part one or more of the methods described herein.

In the context of the present example, machine readable medium 620 is encoded with a set of executable instructions 630-660. It should be understood that part or all of the executable instructions and/or electronic circuits included within one block may, in alternate implementations, be included in a different block shown in the figures or in a different block not shown.

Instructions 630, upon execution, may cause processing resource 610 to request to backup a particular tenant (e.g., one of tenants 140a-n). In one example, instructions 630 may be useful for performing block 310 of FIG. 3.

Instructions 640, upon execution, may cause processing resource 610 to determine namespaces assigned to the particular tenant. In one example, instructions 640 may be useful for performing block 320 of FIG. 3.

Instructions 650, upon execution, may cause processing resource 610 to for each namespace, cause a namespace-level backup/recovery tool (e.g., namespace-level backup/restore engine 213) to backup object data for the namespace and backup data associated with persistent volume claims. In one example, instructions 650 may be useful for performing block 330 of FIG. 3.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A system, comprising:
   one or more processing resources; and
   a non-transitory computer-readable medium, coupled to the one or more processing resources, and having stored therein instructions which, when executed by the one or more processing resources, cause the one or more processing resources to:
   determine, by a container platform and in response to a request to backup a tenant of the container platform, a plurality of namespaces associated with the tenant; and
   cause a namespace-level backup/recovery tool to:
   backup, for each namespace of the plurality of namespaces, object data within a backup location; and
   backup, for each namespace of the plurality of namespaces, data associated with persistent volume claims for each unit of cluster replication within each namespace.

2. The system of claim 1, wherein: the tenant is one of a plurality of tenants of the container platform, and each tenant of the plurality of tenants is associated with a separate one of a plurality of tenant abstractions.

3. The system of claim 2, wherein a tenant abstraction of the plurality of tenant abstractions is associated with the tenant and comprises information indicative of the plurality of namespaces associated with the tenant.

4. The system of claim 3, wherein, to determine the plurality of namespaces associated with the tenant, the instructions further cause the one or more processing resources to query the tenant abstraction associated with the tenant.

5. The system of claim 1, wherein the request is part of a migration of the tenant from a first container cluster to a second container cluster, and execution of the instructions further causes the one or more processing resources to:
   for a namespace of the plurality of namespaces:
   recover the object data for the namespace from the backup location to a corresponding namespace in the second container cluster;
   recover the data associated with the persistent volume claims for each unit of cluster replication within the namespace to the second container cluster; and
   restore tenant storage for the tenant by creating a new filesystem mount in the second container cluster.

6. The system of claim 5, wherein the new filesystem mount points to an empty storage area or to an existing tenant storage for the tenant.

7. The system of claim 1, wherein the request is for a clone operation to be performed.

8. A method, comprising:
   determining, by a container platform and in response to a request to backup a tenant of the container platform, a plurality of namespaces assigned to the tenant; and
   causing a namespace-level backup/recovery tool to:
   backup, for each namespace of the plurality of namespaces, object data within a backup location; and
   backup, for each namespace of the plurality of namespaces, data associated with persistent volume claims for each unit of cluster replication within each namespace.

9. The method of claim 8, wherein: the tenant is one of a plurality of tenants of the container platform, and each tenant of the plurality of tenants is associated with a separate one of a plurality of tenant abstractions.

10. The method of claim 9, wherein a tenant abstraction of the plurality of tenant abstractions is associated with the tenant and comprises information indicative of the plurality of namespaces associated with the tenant.

11. The method of claim 10, wherein determining the plurality of namespaces associated with the tenant comprises querying the tenant abstraction associated with the tenant.

12. The method of claim 8, wherein the request is part of a migration of the tenant from a first container cluster to a second container cluster, and the method further comprises:
for a namespace of the plurality of namespaces:
recovering the object data for the namespace from the backup location to a corresponding namespace in the second container cluster;
recovering the data associated with the persistent volume claims for each unit of cluster replication within the namespace to the second container cluster; and
restoring tenant storage for the tenant by creating a new filesystem mount in the second container cluster.

13. The method of claim 12, wherein the new filesystem mount points to an empty storage area or to an existing tenant storage for the tenant.

14. The method of claim 8, wherein the request is for a clone operation to be performed.

15. A non-transitory machine readable medium storing instructions, which when executed by one or more processing resources of a computer system, cause the one or more processing resources to:
determine, by a container platform and in response to a request to backup a tenant of the container platform, a plurality of namespaces associated with the tenant; and
cause a namespace-level backup/recovery tool to:
backup, for each namespace of the plurality of namespaces, object data within a backup location; and
backup, for each namespace of the plurality of namespaces, data associated with persistent volume claims for each unit of cluster replication within each namespace.

16. The non-transitory machine readable medium of claim 15, wherein: the tenant is one of a plurality of tenants of the container platform, and each tenant of the plurality of tenants is associated with one of a plurality of tenant abstractions.

17. The non-transitory machine readable medium of claim 16, wherein a tenant abstraction of the plurality of tenant abstractions is associated with the tenant and comprises information indicative of the plurality of namespaces associated with the tenant.

18. The non-transitory machine readable medium of claim 17, wherein, to determine the plurality of namespaces associated with the tenant, the instructions further cause the one or more processing resources to query the tenant abstraction associated with the tenant.

19. The non-transitory machine readable medium of claim 15, wherein the request is part of a migration of the tenant from a first container cluster to a second container cluster, and execution of the instructions further causes the one or more processing resources to:
for a namespace of the plurality of namespaces:
recover the object data for the namespace from the backup location to a corresponding namespace in the second container cluster;
recover the data associated with the persistent volume claims for each unit of cluster replication within the namespace to the second container cluster; and
restore tenant storage for the tenant by creating a new filesystem mount in the second container cluster.

20. The non-transitory machine readable medium of claim 19, wherein the new file system mount points to an empty storage area or to an existing tenant storage for the tenant.

* * * * *